(12) United States Patent
Boss et al.

(10) Patent No.: US 9,564,124 B2
(45) Date of Patent: Feb. 7, 2017

(54) DISPLAYING RELEVANT INFORMATION ON WEARABLE COMPUTING DEVICES

(71) Applicant: International Business Machines Corporation, Armonk, NY (US)

(72) Inventors: Gregory J. Boss, Saginaw, MI (US); Andrew R. Jones, Round Rock, TX (US); Paul N. Krystek, Highland, NY (US); C. Steven Lingafelt, Durham, NC (US); Kevin C. McConnell, Austin, TX (US); John E. Moore, Jr., Brownsburg, IN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/082,254

(22) Filed: Mar. 28, 2016

(65) Prior Publication Data

US 2016/0372108 A1    Dec. 22, 2016

Related U.S. Application Data

(63) Continuation of application No. 14/740,856, filed on Jun. 16, 2015.

(51) Int. Cl.
| | | |
|---|---|---|
| *G09G 5/00* | (2006.01) | |
| *G10L 15/02* | (2006.01) | |
| *G06K 9/00* | (2006.01) | |

(52) U.S. Cl.
CPC ........... *G10L 15/02* (2013.01); *G06K 9/00288* (2013.01)

(58) Field of Classification Search
CPC ...................................................... G06F 1/26
See application file for complete search history.

(56) References Cited

U.S. PATENT DOCUMENTS

| | | | |
|---|---|---|---|
| 7,076,737 B2 | 7/2006 | Abbott et al. | |
| 7,395,507 B2 | 7/2008 | Robarts et al. | |
| 7,478,331 B2 | 1/2009 | Abbott et al. | |
| 8,223,932 B2 | 7/2012 | Forbes et al. | |
| 8,264,505 B2 | 9/2012 | Bathiche et al. | |
| 8,275,414 B1 | 9/2012 | Athsani et al. | |
| 8,626,712 B2 | 1/2014 | Abbott et al. | |
| 2009/0006608 A1 | 1/2009 | Gupta et al. | |
| 2009/0141023 A1* | 6/2009 | Shuster ..................... G06T 3/40 |
| | | | 345/419 |

(Continued)

FOREIGN PATENT DOCUMENTS

WO    2009156184 A1    12/2009

OTHER PUBLICATIONS

Lehikoinen et al.; "Perspective Map," Proceedings of the 6th International Symposium on Wearable Computers (ISWC' 02), DOI: 10.1109/ISWC.2002.1167245, 2002, 8 pages.

(Continued)

*Primary Examiner* — Charles Appiah
*Assistant Examiner* — Randy Peaches
(74) *Attorney, Agent, or Firm* — Kristofer L. Haggerty

(57) ABSTRACT

A wearable computing device receives user preferences, wherein the user preferences include information detailing one or more types of information to display based on one or more criteria being satisfied. The wearable computing device determines information to display on the wearable computing device based on the user preferences. The wearable computing device displays the determined information.

1 Claim, 3 Drawing Sheets

(56) References Cited

U.S. PATENT DOCUMENTS

| | | |
|---|---|---|
| 2011/0035406 A1 | 2/2011 | Petrou et al. |
| 2011/0310120 A1 | 12/2011 | Narayanan |
| 2012/0011140 A1 | 1/2012 | Chakra et al. |
| 2013/0044128 A1* | 2/2013 | Liu .......................... G09G 5/00 345/633 |

OTHER PUBLICATIONS

Mukherjee, et al.; "Multimodal Interactions for Contextual Information in Aircraft Cabin Environment using Wearable," An IP.com Prior Art Database Technical Disclosure, IP.com No. 000239060, Oct. 7, 2014, 13 pages.

Disclosed Anonymously, "Detection and Reaction to Contextual Information based on Analysis of a Live Data Stream," An IP.com Prior Art Database Technical Disclosure; IP.com No. 000196971, Jun. 22, 2010, 5 pages.

IBM: List of IBM Patents or Patent Applications Treated as Related (Appendix P), Sep. 30, 2016, pp. 1-2.

Boss et al., Pending U.S. Appl. No. 14/740,865, filed Jun. 16, 2015, titled "Displaying Relevant Information on Wearable Computing Devices," pp. 1-32.

* cited by examiner

DISPLAYING RELEVANT INFORMATION ON WEARABLE COMPUTING DEVICES

TECHNICAL FIELD

The present invention relates generally to wearable computing devices, and more particularly to the display of relevant information on wearable computing devices.

BACKGROUND

Computers have transformed the manner in which we retrieve information and communicated with one another. As time has passed, computers have quickly transformed from stationery devices, such as CPUs, to laptops and mobile devices. Laptops and mobile devices give people the freedom to retrieve information and communicate with one another while on the go. Wearable computing devices are the next step in the evolution of mobile devices. Wearable computing devices consist of watches, bracelets, and even glasses that are capable of receiving and transmitting information, as well as communicating via a network connection.

SUMMARY

The present invention provides a method, system, and computer program product for determining information to display to a user of a wearable computing device. A wearable computing device receives user preferences, wherein the user preferences include information detailing one or more types of information to display based on one or more criteria being satisfied. The wearable computing device determines information to display on the wearable computing device based on the user preferences. The wearable computing device displays the determined information.

DETAILED DESCRIPTION

Embodiments of the present invention will now be described in detail with reference to the accompanying Figures.

Figure 1:
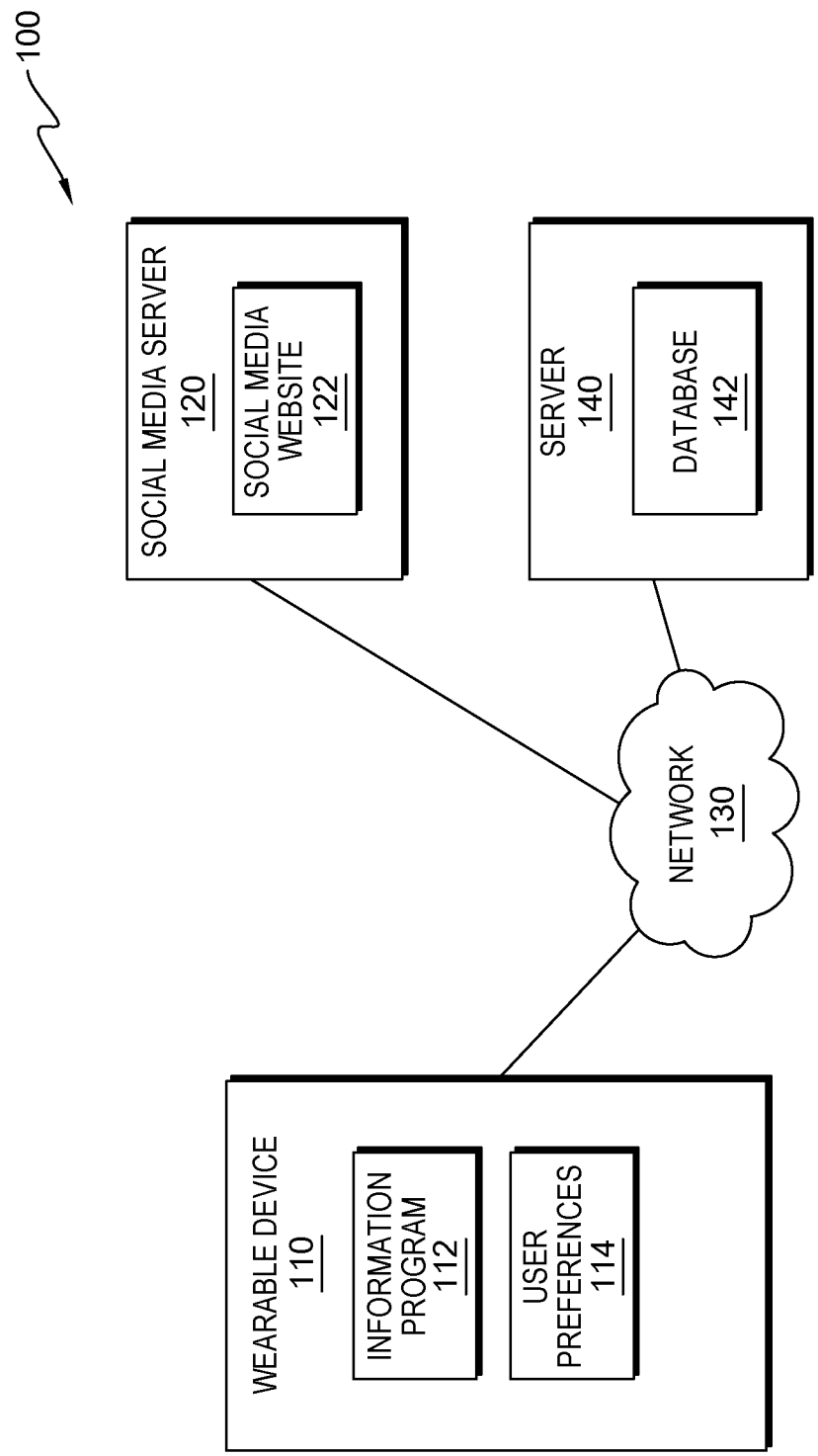
FIG. 1 illustrates an information display system, in accordance with an embodiment of the invention.

FIG. 1 illustrates information display system 100, in accordance with an embodiment of the invention. In an exemplary embodiment, information display system 100 includes wearable device 110, social media server 120, and server 140 all interconnected via network 130.

In the example embodiment, network 130 is the Internet, representing a worldwide collection of networks and gateways to support communications between devices connected to the Internet. Network 130 may include, for example, wired, wireless, or fiber optic connections. In other embodiments, network 130 may be implemented as an intranet, a local area network (LAN), or a wide area network (WAN). In general, network 130 can be any combination of connections and protocols that will support communications between wearable device 110, social media server 120, and server 140.

Social media server 120 includes social media website 122. Social media server 120 may be a desktop computer, a notebook, a laptop computer, a tablet computer, a handheld device, a smart-phone, a thin client, or any other electronic device or computing system capable of receiving and sending data to and from other computing devices, such as wearable device 110, via network 130. Although not shown, optionally, social media server 120 can comprise a cluster of web servers executing the same software to collectively process the requests for the web pages as distributed by a front end server and a load balancer. In an exemplary embodiment, social media server 120 is a computing device that is optimized for the support of websites which reside on social media server 120, such as social media website 122, and for the support of network requests related to websites, which reside on social media server 120. Social media server 120 is described in more detail with reference to FIG. 3.

Social media site 122 is a collection of files including, for example, hypertext markup language (HTML) files, Cascading Style Sheets (CSS) files, image files and JavaScript files. Social media site 122 can also include other resources such as audio files and video files. In an exemplary embodiment, social media site 152 is a social media website such as Facebook® (Facebook is a registered trademark of Facebook, Inc.), Twitter® (Twitter is a registered trademark of Twitter, Inc.), LinkedIn® (LinkedIn is a registered trademark of LinkedIn, Ltd.), or Myspace® (Myspace is a registered trademark of Myspace, LLC).

Server 140 includes database 142. Server 140 may be a desktop computer, a notebook, a laptop computer, a tablet computer, a handheld device, a smart-phone, a thin client, or any other electronic device or computing system capable of receiving and sending data to and from other computing devices such as wearable device 110 via network 130. Although not shown, optionally, server 140 can comprise a cluster of web servers executing the same software to collectively process the requests for the web pages as distributed by a front end server and a load balancer. Server 140 is described in more detail with reference to FIG. 3.

Database 142 includes information such as public records, personal information, articles, audio feeds, organizational membership information, or any other type of public or private information. For example, in one embodiment, database 142 may include magazine subscription information, while in another embodiment, database 142 may include information related to background checks performed by a background checking organization. Database 142 is described in more detail with reference to FIG. 3.

Wearable device 110 includes information program 112 and user preference 114. In the example embodiment, wearable device 110 is a computing device that is capable of being worn by a user such as a smart watch, smart glasses/goggles, a smart ring, smart bracelet or any other type of wearable computing device capable of receiving and sending data to and from other computing devices, such as social media server 120 and server 140, via network 130. In other embodiments, wearable device 110 may be a desktop computer, a notebook, a laptop computer, a tablet computer, a handheld device, a smart-phone, a thin client, or any other electronic device or computing system capable of receiving and sending data to and from other computing devices, such as social media server 120 and server 140, via network 130. Wearable device 110 is described in more detail with reference to FIG. 3.

User preferences 114 is user input detailing information including preferences detailing the type of information that should be displayed based on the situation. In the example embodiment, user preference 114 are guidelines which dictate what information is displayed to the user of wearable device 110. For example, the user of wearable device 110 may input preferences stating that if the user is in an art museum, the user prefers that information related to the location (art museum) is displayed. Continuing the example, the user of wearable device 110 may input preferences stating that if the user is not present within a certain location or locations, information related/relevant to the conversation taking place should be displayed. User preference 114 is described in more detail with reference to FIG. 2.

Information program 112 is a software application capable of receiving user preferences 114 from the user of wearable device 110 via a user interface or via another computing device via network 130. In the example embodiment, information program 112 is also capable of identifying the location of wearable device 110 and additionally capable of identifying the identities of other people within a certain proximity of wearable device 110. Information program 112 is also capable of determining topics of a conversation occurring within a certain proximity of wearable device 110. In addition, information program 112 is capable of retrieving information regarding identified people from other computing devices, such as social media server 120 and server 140, via network 130. Furthermore, information program 112 is capable of displaying information, determined to be relevant by referencing user preferences 114, to the user of wearable device 110. The operations and functions of information program 112 are described in more detail with reference to FIG. 2.

Figure 2:
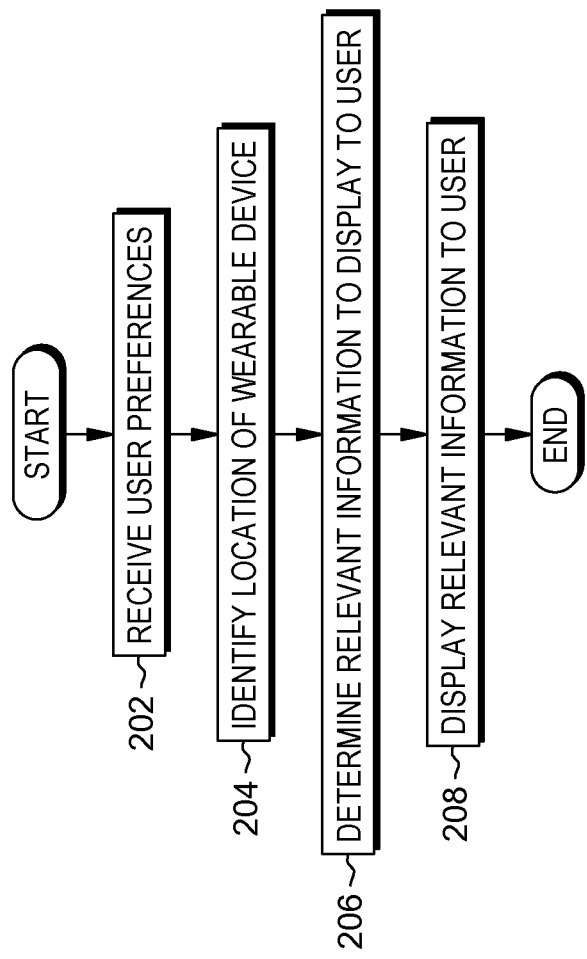
FIG. 2 is a flowchart illustrating the operations of the information program of FIG. 1 in identifying and displaying relevant information on a wearable computing device, in accordance with an embodiment of the invention.

FIG. 2 is a flowchart illustrating the operation of information program 112 in identifying and displaying relevant information on a wearable computing device. In the example embodiment, information program 112 receives user preferences 114 from the user of wearable device 110 via a user interface. In the example embodiment, user preferences 114 contain a hierarchical list of the type of information the user of wearable device 110 desires to be displayed for a given situation. For example, user preferences 114 may detail that the user of wearable device 110 prefers information regarding the topics of conversation happening in the user's proximity to be displayed unless the user is at an event, in which case the user of wearable device 110 prefers information about the location and/or the event to be displayed. In another example, user preferences 114 may detail that if the user of wearable device 110 is at work, then information related to work data or related to work-related conversations taking place should be displayed.

Information program 112 determines the location of wearable device 110 (step 204). In the example embodiment, information program 112 determines the location of wearable device 110 by utilizing a GPS module/unit located in wearable device 110. In other embodiments, information program 112 may access a calendar or itinerary of the user of wearable device 110 in order to determine the location of wearable device 110 at a given time. In this other embodiment, a calendar entry or itinerary may have location information contained within the description of the event or within the metadata corresponding to the entry. Additionally, information program 112 may cross-reference the information on a calendar or itinerary of the user of wearable device 110 with a GPS location determined by utilizing the GPS module/unit located in wearable program 112 to determine whether the user of wearable device 110 has attended a certain event or appointment. In further embodiments, information program 112 may communicate with social media server 120 via network 130 in order to analyze recent social media status updates and determine the location of wearable device 110 (by way of determining the location of the user of wearable device 110).

Information program 112 determines relevant information to display to the user of wearable device 110 based on user preferences 114 (step 206) and displays the relevant information to the user of wearable device 110. In the example embodiment, information program 112 determines the relevant information based on the location and based on what user preferences 114 detail for each given situation. For example, if user preferences 114 detail that if the location of wearable device 110 is at an event or in a location, such as an art museum, then the relevant information that should be displayed is information about the location, wearable device 110 will determine relevant information about the location (i.e., the art museum) to the user of wearable device 110. This process is two-fold. First, information program 112 determines the location of wearable device 110 (as described above). Second, information program 112 cross-references the location information with user preferences 114 to determine whether the preferences correspond to the determined location. For example, if the location is determined to be the home address of the user of wearable device 110, then user preferences 114 may denote that general information, such as current events, are to be displayed to the user of wearable device 110. In the example embodiment, information program 112 may retrieve information about the location from a social media website, such as social media website 122, and/or from alternative internet resources via network 130 (such as database 142).

Additionally, user preferences 114 may detail that if the wearable device 110 is at a home location, outside, or at a specific social event, information program 112 determines the relevant information to display based on conversation taking place nearby. For example, user preferences 114 may detail that if the location of wearable device 110 (and therefore the user) does not correspond to a business related event (determined by referencing a user calendar and utilizing natural language processing), then information program 112 displays information related to conversation taking place nearby. In the example embodiment, information program 112 utilizes audio and video devices, such as a microphone and a camera, present on wearable device 110 in order to capture video and accompanying sound of the environment. Information program 112 may then utilize facial recognition software or communicate with nearby electronic devices (such as smartphones) to determine the identity of people nearby. In the example embodiment, images captured may be cross-referenced (utilizing facial recognition software) with a public database or private database, such as an address book of the user, to determine the identity of the nearby people. Information program 112 may then assign an ID to each individual identified.

Once each nearby individual is identified, audio is analyzed using speech analysis software to determine keywords in the detected speech. In the example embodiment, information program 112 determines keywords based on word repetition within speech, frequency of non-common words, such as pronouns, comparison to a user-defined database of pre-selected keywords, or any other known method of conversation analysis. The determined keywords represent the topics of conversation taking place. Once the keywords/topics are determined, information program 112 displays the keywords along with information relevant to the keywords.

For example, if a company's name is repeated several times within a detected speech, information program 112 may determine that the company's name is a keyword and therefore retrieve and display information related to the company to the user of wearable device 110. Information related to the company may be retrieved from various sources such as the website of the company, recent news articles, recent social media messages, or any other information retrievable via network 130, or input by a user.

Additionally, if several individuals are identified within a certain proximity of wearable device 110, information program 112 may utilize template matching techniques by comparing a snapshot or multiple snapshots of the video feed with speaking and non-speaking face templates in order to determine which individual is speaking. This may be coupled with facial recognition techniques to determine the identity of the speaker. Alternatively, information program 112 may receive pre-loaded voiceprints of individuals associated with the user of wearable device 110 and may compare the detected speech to the pre-loaded voiceprints to determine the identity of the speaker.

In other embodiments, the identity of nearby individuals may not be determined prior to analyzing nearby conversation. Rather, information program 112 analyzes nearby conversation directly and assigns an ID to each distinct individual. Distinct individuals are identified based on each person's distinct voice patterns and tone.

In one embodiment, once information program 112 identifies an individual within a certain proximity to wearable device 110, information program 112 may cross-reference the identified individual with a pre-loaded or retrieved association list containing a group of contacts associated with the user of wearable device 110. If information program 112 determines that the individual is not contained within the association list, information program 112 does not display any information relevant to the identified individual. If information program 112 determines that the individual is contained within the association list, information program 112 analyzes the conversation taking place nearby as described above.

In one embodiment, user preferences 114 may indicate that information program 112 is to retrieve contextual information regarding the environment and people within a certain proximity of wearable device 110 from social media or other sources. In this embodiment, information program 112 may identify each speaker within a certain proximity and retrieve (and display) information regarding the identified speaker/individual from social media server via network 130. For example, user preferences 114 may obtain information such as information related to recent activities the individual has participated in, recent topics of discussion the individual has participated in, recent conversations the user of wearable device 110 has had with the individual, likes/dislikes, interests, hobbies, biographical information, and educational information. Information program 112 may also obtain information from additional sources other than social media related sources, such as public and private records, newspaper databases, and the like via network 130.

Furthermore, information program 112 may retrieve information (from the sources described above) and display information related to the world view of an identified speaker within a certain proximity of wearable device 110. For each identified speaker/individual, information program 112 may retrieve information related to the individual's social persona and determine a basic ideological view of a conversation taking place. For example, information program 112 may retrieve information from a social media site of the individual (via social media server 120) with regard to religious affiliation and/or political affiliation by utilizing keyword searching and natural language processing, in the same manner as described above. This information is then displayed to the user of wearable device 120 so that the user is aware of religious or political topics to avoid or discuss. In certain cases, information program 112 may also compare the identified individual's world view with world view information of the user of wearable device 120. For example, information program 112 may retrieve information regarding religious affiliation of the individual and compare the information to religious information regarding the user of wearable device 110 retrieved from a source, such as social media server 120, or input by the user. Information program 112 may then display commonalities that exist between the world view (such as religious beliefs) of the individual and the user. Furthermore, information program 112 may also display the differences between the world view of the individual and the user. While religion and political beliefs/affiliation are given as examples of topics encompassed by the term world view, the term world view may include an assortment of beliefs and topics regarding a person's social and ideological beliefs. Furthermore, information program 112 may also display commonalities between the individual and the user of wearable device 110 with regard to shared interests, likes/dislikes, hobbies and the like.

Overall, whether the relevant information displayed corresponds to a location, corresponds to conversation, corresponds to retrieved social media information regarding an identified individual, and/or corresponds to the world view of an identified individual is dependent on the preferences of the user of wearable device 110. Furthermore, in any of the aforementioned embodiments, information program 112 may retrieve information from social media sources, public sources, private sources, user input, local memory or any other source available via network 130. Furthermore, user preferences 114 may contain topics to filter which detail topics or information regarding an individual, location, or object which are not to be displayed by information program 112. For example, user preferences 114 may detail that information regarding sexual orientation or certain religious practices be filtered out and not displayed to the user of wearable device 110.

In one embodiment, once information program 112 displays information to the user of wearable device 110, the user has the option to halt or continue the lines of information being displayed. For example, if after a first line is displayed to the user, the user wants to halt the display, the user may press a button on wearable device 110, say a pre-configured voice command or perform a pre-configured gesture in order to stop/halt the display. Information program 112 receives the input or detects the voice command or gesture utilizing the methods described above and halts the display. On the other hand, if the user of wearable device 110 wants to continue after a halt or fast forward through certain information, the user may press a specified button, say a pre-configured voice command, or perform a pre-configured gesture. Additionally, features of wearable device 110 may allow for rewind of information displayed by information program 112 via similar methods as described above.

The foregoing description of various embodiments of the present invention has been presented for purposes of illustration and description. It is not intended to be exhaustive nor to limit the invention to the precise form disclosed. Many modifications and variations are possible. Such modifications and variations that may be apparent to a person skilled in the art of the invention are intended to be included within the scope of the invention as defined by the accompanying claims.

Figure 3:
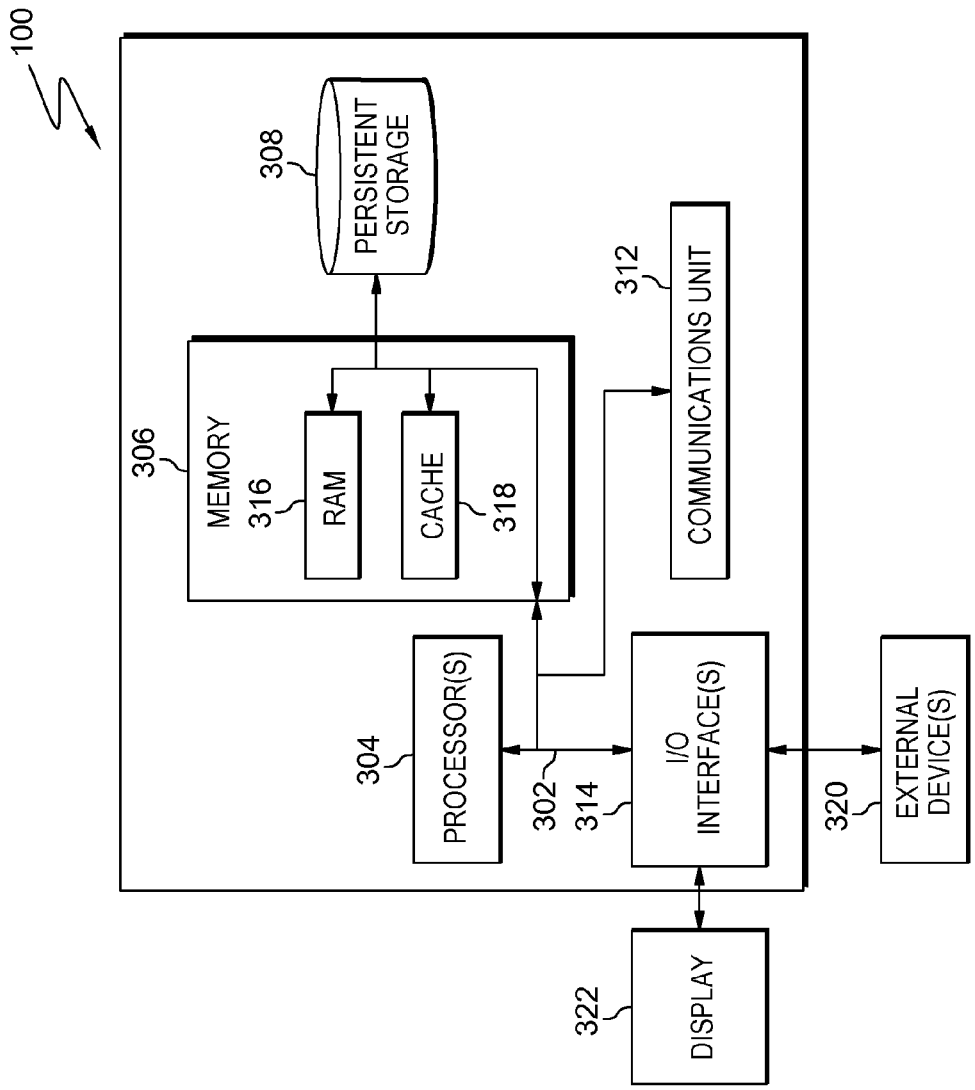
FIG. 3 is a block diagram depicting the hardware components of the information display system of FIG. 1, in accordance with an embodiment of the invention.

FIG. 3 depicts a block diagram of components of wearable device 110, social media server 120, and server 140 of information display system 100 in accordance with an illustrative embodiment of the present invention. It should be appreciated that FIG. 3 provides only an illustration of one implementation and does not imply any limitations with regard to the environments in which different embodiments may be implemented. Many modifications to the depicted environment may be made.

Wearable device 110, social media server 120, and server 140 include communications fabric 302, which provides communications between computer processor(s) 304, memory 306, persistent storage 308, communications unit 312, and input/output (I/O) interface(s) 314. Communications fabric 302 can be implemented with any architecture designed for passing data and/or control information between processors (such as microprocessors, communications and network processors, etc.), system memory, peripheral devices, and any other hardware components within a system. For example, communications fabric 302 can be implemented with one or more buses.

Memory 306 and persistent storage 308 are computer-readable storage media. In this embodiment, memory 306 includes random access memory (RAM) 316 and cache memory 318. In general, memory 306 can include any suitable volatile or non-volatile computer-readable storage media.

The programs information program 112 and user preferences 114 in computing device 110; social media website in social media server 120; and database 142 in server 140, are stored in persistent storage 308 for execution by one or more of the respective computer processors 304 via one or more memories of memory 306. In this embodiment, persistent storage 308 includes a magnetic hard disk drive. Alternatively, or in addition to a magnetic hard disk drive, persistent storage 308 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 308 may also be removable. For example, a removable hard drive may be used for persistent storage 308. Other examples include optical and magnetic disks, thumb drives, and smart cards that are inserted into a drive for transfer onto another computer-readable storage medium that is also part of persistent storage 308.

Communications unit 312, in these examples, provides for communications with other data processing systems or devices. In these examples, communications unit 312 includes one or more network interface cards. Communications unit 312 may provide communications through the use of either or both physical and wireless communications links. The programs information program 112 and user preferences 114 in wearable device 110, social media website in social media server 120, and database 142 in server 140, may be downloaded to persistent storage 308 through communications unit 312.

I/O interface(s) 314 allows for input and output of data with other devices that may be connected to wearable device 110, social media server 120, and server 140. For example, I/O interface 314 may provide a connection to external devices 320 such as, a keyboard, keypad, a touch screen, and/or some other suitable input device. External devices 320 can also include portable computer-readable storage media such as, for example, thumb drives, portable optical or magnetic disks, and memory cards. Software and data used to practice embodiments of the present invention, e.g., information program 112 and user preferences 114 in wearable device 110, social media website in social media server 120, and database 142 in server 140, can be stored on such portable computer-readable storage media and can be loaded onto persistent storage 308 via I/O interface(s) 314. I/O interface(s) 314 can also connect to a display 322.

Display 322 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature. The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge devices. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or device. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for determining information to display to a user of a wearable computing device, comprising the steps of:

identifying a current time and a current location of a wearable computing device using a global positioning system module included in the wearable computing device;

referencing a calendar associated with a wearer of the wearable computing device to determine whether an event is associated with the current time;

based on determining that an event is associated with the current time, determining whether the wearable computing device is within a first threshold distance of the event;

based on determining that the wearable computing device is within the first threshold distance of the event, obtaining and displaying information relevant to the event;

based on determining that the wearable computing device is not within the first threshold distance of the event, identifying one or more users within a second threshold distance of the wearable computing device;

communicating with a camera module of the wearable computing device to capture live video footage of the one or more users;

identifying a speaker of the one or more users by comparing one or more snapshots of the live video footage of the one or more users to templates of speaking and non-speaking users;

determining an identity of the speaker by comparing the one or more snapshots to users of one or more social media platforms;

determining whether the speaker is associated with the wearer on at least one of the one or more social media platforms; and based on determining that the speaker is associated with the wearer on the at least one of the one or more social media platforms, identifying and displaying one or more commonalities between the speaker and the wearer detailed by the at least one social media platform.

* * * * *